(12) United States Patent
Reusch et al.

(10) Patent No.: US 10,377,488 B1
(45) Date of Patent: Aug. 13, 2019

(54) TANDEM-WING AIRCRAFT SYSTEM WITH SHROUDED PROPELLER

(71) Applicant: DRAGANFLY INNOVATIONS INC., Saskatoon (CA)

(72) Inventors: Garry Reusch, Calgary (CA); Mark Ter Keurs, Surrey (CA); Nathan Armstrong, Calgary (CA); Zenon Dragan, Saskatoon (CA)

(73) Assignee: Draganfly Innovations Inc., Saskatoon (CA)

( * ) Notice: Subject to any disclaimer, the term of this patent is extended or adjusted under 35 U.S.C. 154(b) by 282 days.

(21) Appl. No.: 15/584,815

(22) Filed: May 2, 2017

Related U.S. Application Data

(60) Provisional application No. 62/330,652, filed on May 2, 2016.

(51) Int. Cl.

| | |
|---|---|
| *B64C 39/08* | (2006.01) |
| *B64C 39/02* | (2006.01) |
| *B64C 3/16* | (2006.01) |
| *B64C 3/18* | (2006.01) |
| *B64C 5/08* | (2006.01) |
| *B64C 1/16* | (2006.01) |

(52) U.S. Cl.
CPC .............. *B64C 39/08* (2013.01); *B64C 1/16* (2013.01); *B64C 3/16* (2013.01); *B64C 3/185* (2013.01); *B64C 5/08* (2013.01); *B64C 39/024* (2013.01); *B64C 2201/021* (2013.01); *B64C 2201/086* (2013.01); *B64C 2201/104* (2013.01); *B64C 2201/127* (2013.01); *B64C 2201/162* (2013.01)

(58) Field of Classification Search
CPC .......... B64C 39/08; B64C 39/06; B64C 1/16; B64C 1/26; B64C 1/1476; B64C 3/185; B64C 3/18; B64C 2201/162; B64C 2201/165; B64C 11/001; B64D 27/24
USPC .......................................................... 244/45
See application file for complete search history.

(56) References Cited

U.S. PATENT DOCUMENTS

| | | | | |
|---|---|---|---|---|
| 2,401,853 | A * | 6/1946 | Bailey ..................... | F42B 10/06 |
| | | | | 114/20.1 |
| 2011/0226174 | A1* | 9/2011 | Parks ....................... | B60F 5/02 |
| | | | | 114/313 |

* cited by examiner

*Primary Examiner* — Timothy D Collins
*Assistant Examiner* — Terri L Filosi
(74) *Attorney, Agent, or Firm* — Suiter Swantz pc llo

(57) ABSTRACT

A tandem-wing unmanned aircraft system (UAS) includes forward and aft wings mounted to the fuselage by frangible spar elements, the forward wings in a shoulder-wing configuration and the aft wings in a low-wing configuration. The forward and aft wings may incorporate fill-span multifunctional control surfaces on their trailing edges. The wing design prevents interference with airflow over the fuselage into a tail-mounted ducted propeller assembly, which pivots to provide vectored thrust. A nose compartment at the nose end of the fuselage may include a forward-mounted camera with a hemispherical field of view, the nose camera protected by transparent exterior panels. A ventral cargo compartment mounted amidships may include a ventral camera gimbal-mounted to provide an overhead perspective; the ventral camera may be gimbal-mounted for articulation along multiple rotational axes to provide additional views of the UAS exterior.

13 Claims, 7 Drawing Sheets

TANDEM-WING AIRCRAFT SYSTEM WITH SHROUDED PROPELLER

CROSS-REFERENCE TO RELATED APPLICATIONS

The present application claims the benefit under 35 U.S.C. § 119(e) of U.S. Provisional Application 62/330,652 filed May 2, 2016 entitled TANDEM-WING AIRCRAFT SYSTEM WITH SHROUDED PROPELLER which is incorporated by reference in its entirety.

TECHNICAL FIELD

Embodiments of the inventive concepts disclosed herein relate generally to unmanned aircraft systems. More particularly, embodiments of the inventive concepts disclosed herein relate to an unmanned aircraft system and device of tandem-wing design and configured for yaw stability and control via an aft-mounted shrouded propeller assembly. The unmanned aircraft system may incorporate a ventral cargo compartment for optimal balance over a broad variety of load configurations.

SUMMARY

Embodiments of the inventive concepts disclosed herein are directed to a tandem-wing unmanned aircraft system (UAS). The UAS includes a fuselage extending from a nose end to a tail end, the nose end including a nose compartment enclosed by transparent exterior panels. The fuselage may enclose a UAS control system for managing flight operations and onboard peripherals as well as a battery or similar power source. The wings of the UAS may be attached to the fuselage by breakaway spar elements and include multifunctional full-span control surfaces on their trailing edges. Each wing may extend from the fuselage at a defined dihedral angle to terminate in a wingtip, which may include a longitudinal stabilizer. The forward wings are attached in a high or shoulder wing configuration and swept forward, while the aft wings are attached in a low wing configuration and swept aft. The UAS may include a ventrally positioned cargo compartment between the forward and aft wings; the cargo compartment may include a ventral exterior panel with a ventral opening through which a ventrally mounted belly camera may extend for ground surveillance while the UAS is inflight. The UAS may include a tail-mounted propeller assembly shrouded and pivotable to provide vectored and ducted thrust; the propeller shaft may be canted slightly downward from the horizontal, and the shroud may extend aft of the propeller blades.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
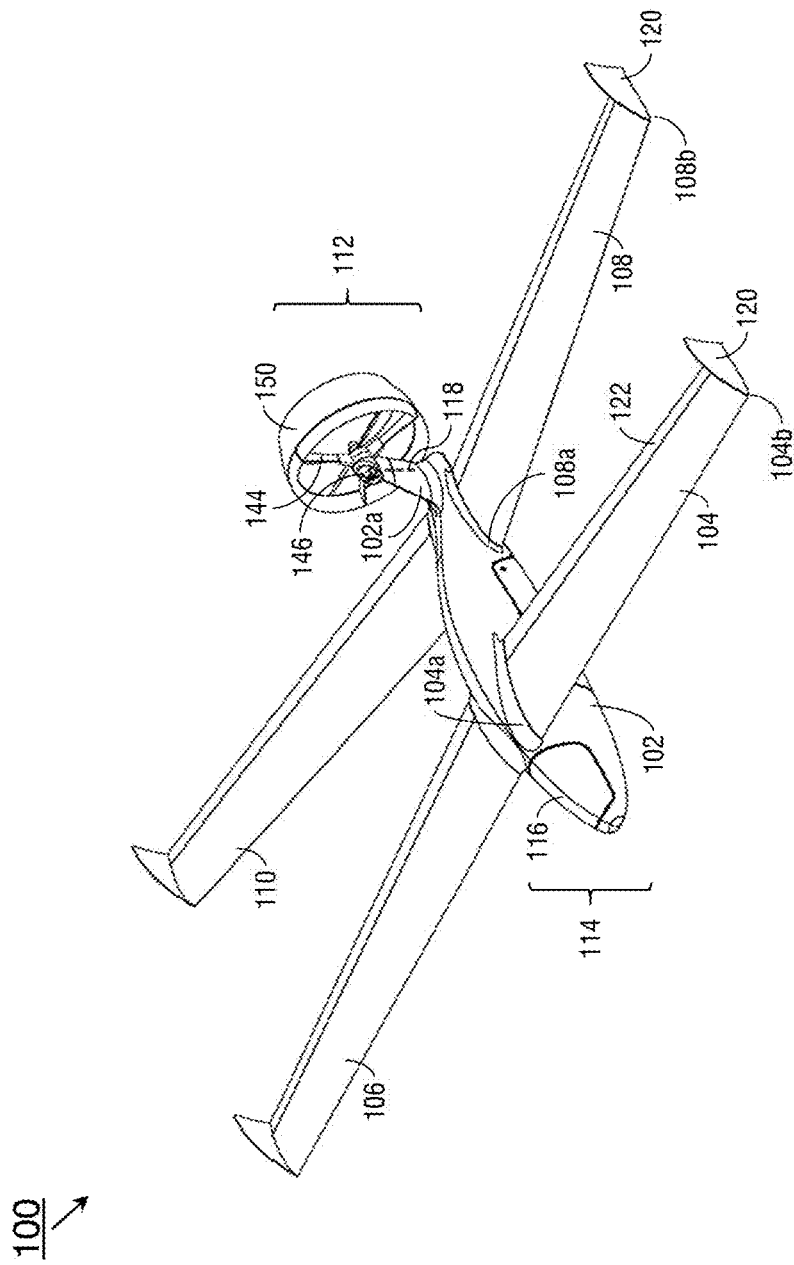
FIG. 1 is a forward perspective view of an exemplary embodiment of a tandem-wing aircraft system according to the inventive concepts disclosed herein.
Figure 2:
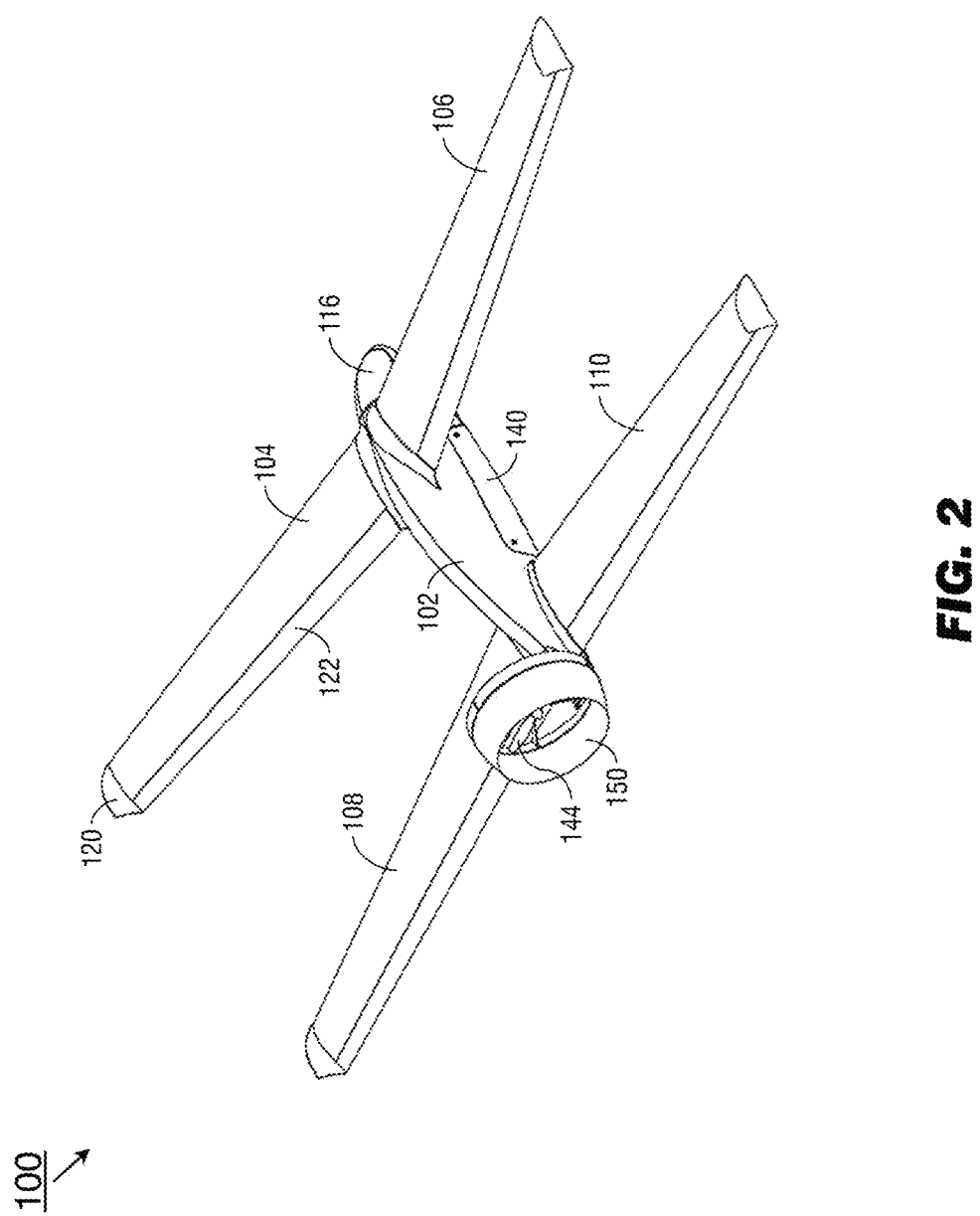
FIG. 2 is an aft perspective view of the aircraft system of FIG. 1.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft system and device (otherwise known as an unmanned aerial vehicle, or UAV) incorporating a tandem-wing design that provides high lift capacity in a compact planform. The tandem-wing configuration may enhance the overall stability and energy efficiency of the aircraft system while allowing for high torque at low speeds. In an exemplary embodiment, the aircraft system may include a forward camera with a hemispherical or semispherical field of view mounted in the nose and a belly camera for ground surveillance positioned in a modular ventral cargo compartment, which camera may be gimbal-mounted to expand its field of view. The aircraft system may include an aft propeller assembly configured to rotate in order to provide vectored thrust and reduce drag by providing a frictionless high speed air exhaust. The fuselage may include ventrally mounted skids to protect other structural elements of the aircraft system from ground contact.

Aircraft Elements, Generally

Figure 3:
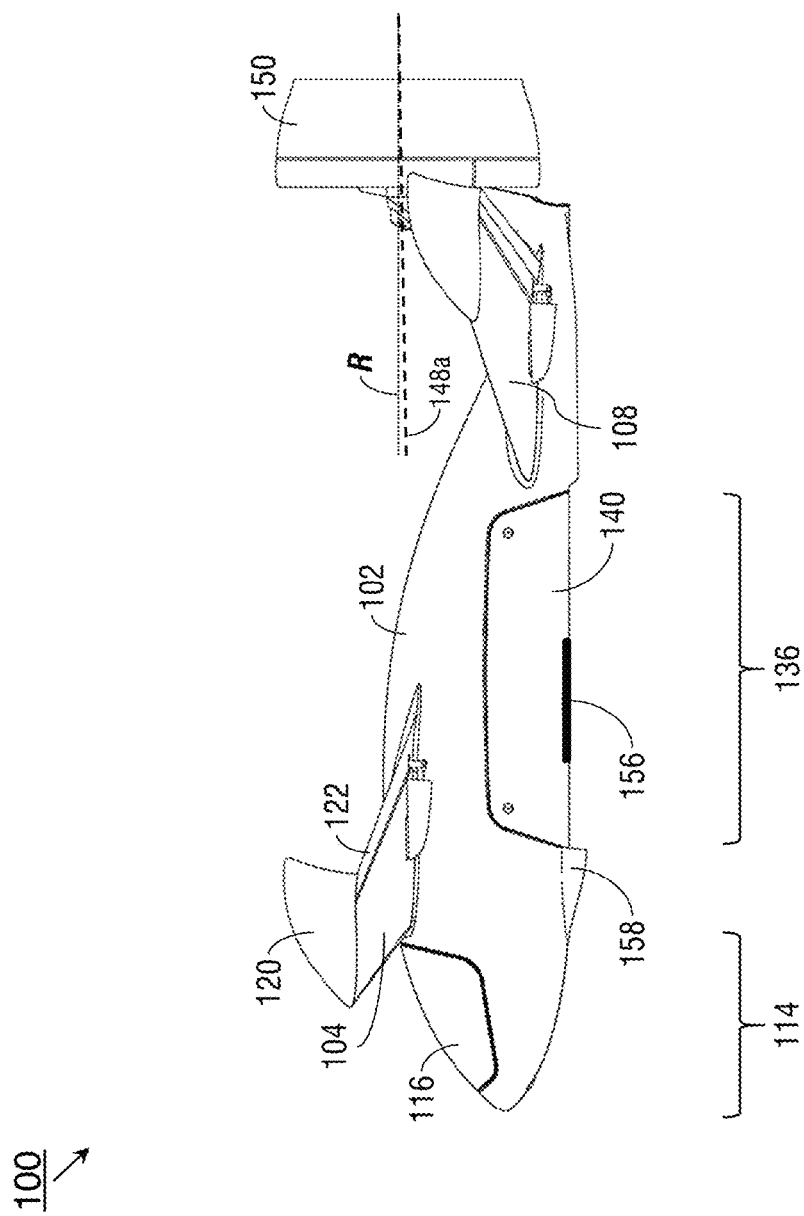
FIG. 3 is a port side view of the aircraft system of FIG. 1.
Figure 4:
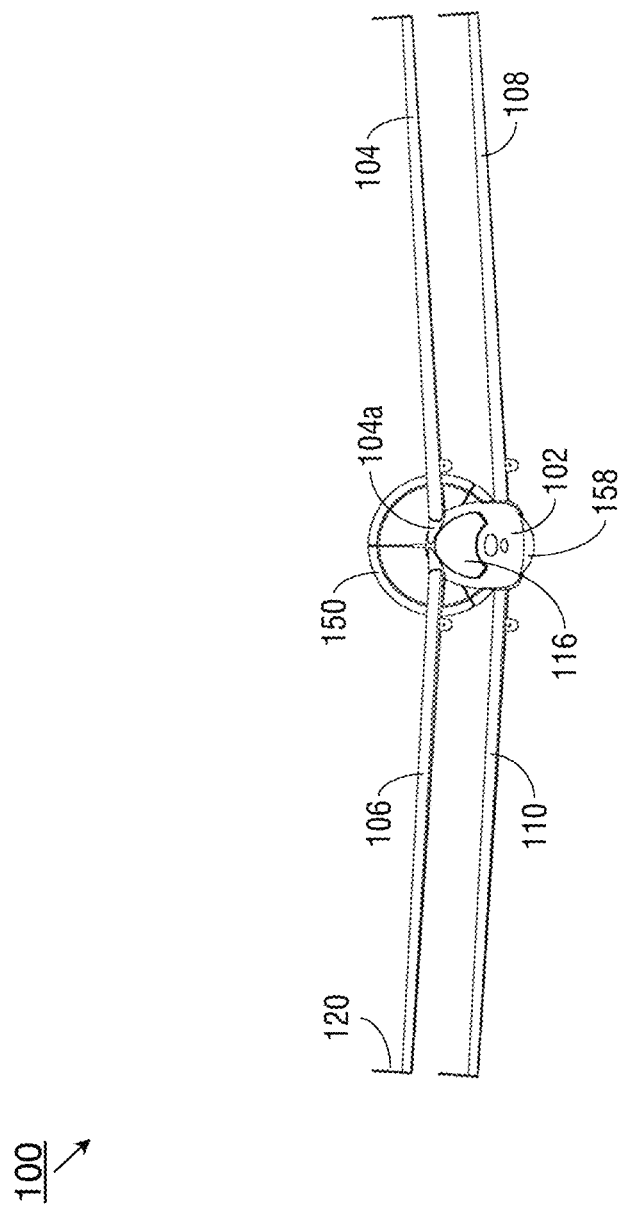
FIG. 4 is a forward elevation view of the aircraft system of FIG. 1.

Referring generally to FIGS. 1-5, an exemplary embodiment of a tandem-wing UAS 100 according to the inventive concepts disclosed herein may include a fuselage 102 extending from a nose end to a tail (102a), to which fuselage the forward wings 104 and 106, aft wings 108 and 110, and a tail-mounted propeller assembly 112 may be mounted. For example, the forward wings (port forward wing 104, starboard forward wing 106) and aft wings (port aft wing 108, starboard aft wing 110) may be dihedral wings of equivalent size and surface area. The forward wings 104, 106 may be swept slightly forward and mounted in either a high-wing or shoulder-wing configuration to counteract thrust-pitch coupling. The aft wings 108, 110 may be swept slightly aft and mounted in a low-wing configuration to avoid interfering with airflow into the propeller assembly 112. As best shown by FIG. 4, the forward wings 104, 106 and aft wings 108, 100 may extend dihedrally from the fuselage 102 at an angle of 3 to 5 degrees. In a preferred embodiment, the dihedral angle of the forward and aft wings 104-110 is substantially 3 degrees. Each forward and aft wing (e.g., port forward wing 104 and port aft wing 108) may extend from a wing root (104a, 108a) to a wingtip (104b, 108b); each wingtip (104b, 108b) may be substantially 0.05 m (50 mm) higher than its corresponding wing root (104a, 108a) to prevent dragging or gripping of, and potential damage to, the forward and aft wings 104-110 due to ground contact. As a result of the positioning of the forward wings 104, 106 and aft wings 108, 110, the UAS 100 may have a center of gravity ($C_G$) below its center of lift ($C_L$).

Nose Compartment and Tail Shaft

The fuselage 102 may include a nose compartment 114 at the nose end, the nose compartment 114 enclosed by one or more transparent exterior panels 116. The propeller assembly 112 may be mounted to the tail (102a) via an interior mounting shaft (118) around which the propeller assembly 112 may pivot, as described in greater detail below.

Wing Stabilizers/Control Surfaces

Each forward wing 104, 106 and aft wing 108, 110 may include a longitudinal stabilizer 120 (e.g., winglet, endplate) removably mounted to its wingtip (104b, 108b). For example, the longitudinal stability of the UAS 100 may be fine-tuned by the attachment or removal of any combination of longitudinal stabilizers to or from the port forward wing 104, starboard forward wing 106, port aft wing 108, and starboard aft wing 110. Furthermore, each forward or aft wing 104-110 may include a control surface 122 on its trailing edge. For example, the control surface 122 may be a full-span multifunctional control surface extending at least 75% of the wingspan; in a preferred embodiment each control surface 122 extends substantially across the full span of the forward or aft wing 104-110. Each control surface 122 may be independently articulable by the UAS control system (124) via a discrete motor element (124a) within the wing 104-110 and may be capable of performing the functions of a flap, an aileron, and an elevator as dictated by, e.g., the current flight segment, flight envelope, or configuration of the UAS 100. As each control surface 122 may be independently articulable by its own discrete motor element 124a, the UAS 100 may employ fully customized airfoil configurations throughout the flight envelope, depending on the particular flight segment or atmospheric conditions. For example, both forward wings 104, 106 and aft wings 108, 110 may apply, via the control surfaces 122, some degree of flaps for low speed flight, or provide a degree of body angle control at various speeds via differential application of flaps between the forward and aft wings 104-110. Furthermore, or alternatively, the control surfaces 122 of the forward wings 104, 106 may be differentially articulated for roll control, while the control surfaces 122 of the aft wings 108, 110 may be uniformly articulated for pitch control. Each discrete motor element 124a may be connected to, and powered by, the UAS control system 124 as described in further detail below.

Wing Spars, Nose Camera and Prop Rotation

Figure 5:
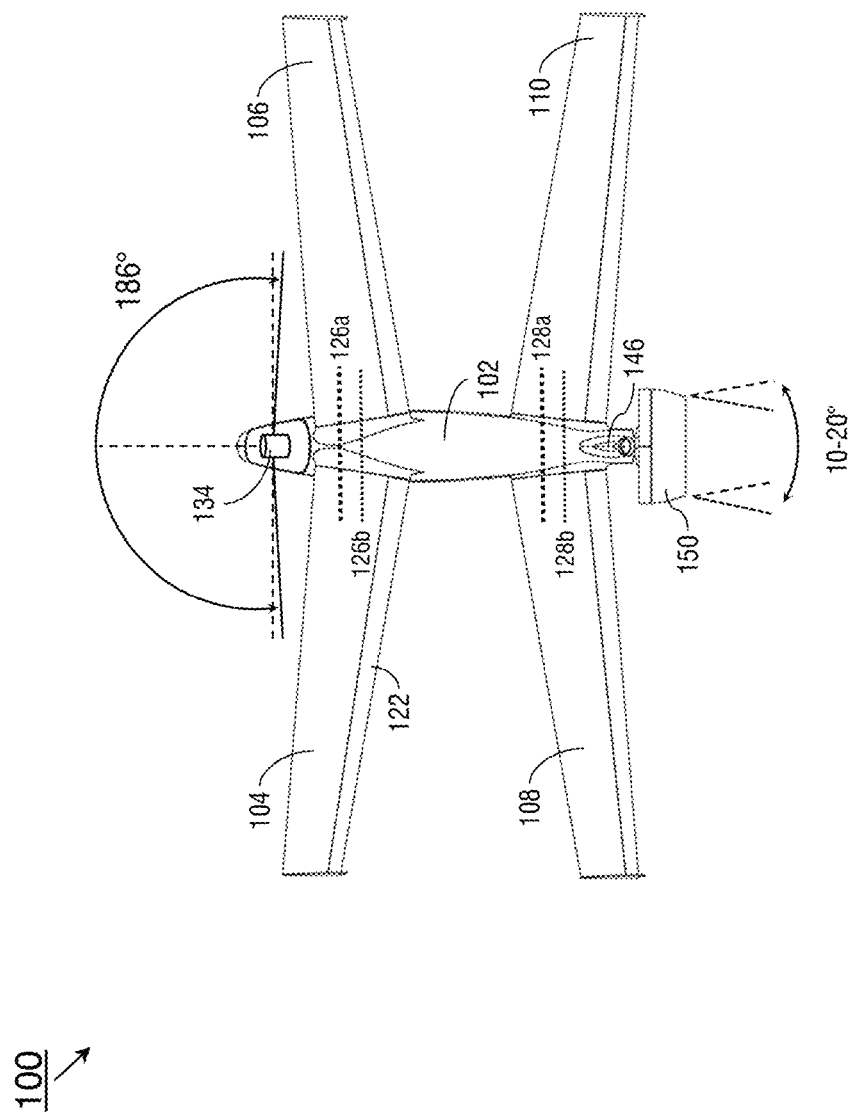
FIG. 5 is a dorsal overhead view of the aircraft system of FIG. 1.

As best shown by FIG. 5, the forward and aft wings 104-110 may be mounted to the fuselage 102 by sacrificial spar elements 126a-b, 128a-b fashioned of a frangible material. In order to protect the fuselage 102 and wings 104-110 from potential impact damage under emergency landing or recovery conditions, the spar elements 126a-b, 128a-b may fracture, allowing the wings 104-110 to be jettisoned whole rather than, e.g., fracturing along the wingspan. For example, the forward wings 104, 106 may incorporate front and rear carry-through spar elements 126a-b, and the aft wings 108, 110 may incorporate front and rear carry-through spar elements 128a-b, which spar elements may extend through the fuselage 102 to connect the port and starboard forward wings (104, 108) and aft wings (106, 110). The front and rear spar elements 126a-b, 128a-b may include, for example, major spar elements 126a, 128a having a first thickness or dimension, and configured to fracture in response to a first impact force, and minor spar elements 126b, 128b, having a second and lesser thickness or dimension than that of the major spar elements 126a, 128a; the minor spar elements 126b, 128b may similarly be configured to fracture in response to a lower impact force than that required to fracture the major spar elements.

Figure 6:
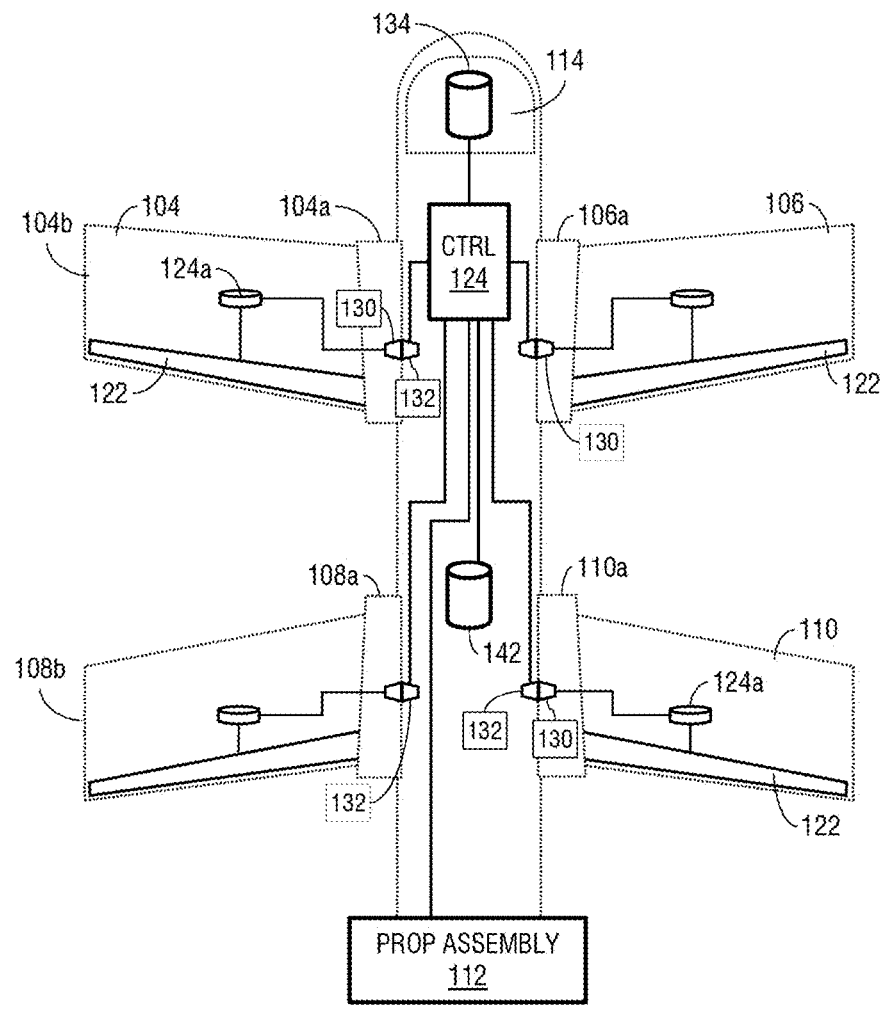
FIG. 6 is a highly diagrammatic overhead view of the aircraft system of FIG. 1.

Referring also to FIG. 6, indexed electrical connectors (130) in each wing root (104a, 106a, 108a, 110a) may removably connect to counterpart connectors (132) on the fuselage 102 to provide, via operator-independent positive electrical connections, power to the control surfaces 122 in each wing 104-110 (via discrete motor elements 124). The paired connectors 130-132 may detach from each other, e.g., should a wing 104-110 be jettisoned by impact. The nose compartment 114 may include a forward-mounted nose camera 134 capable of capturing images, e.g., to provide a first-person perspective for a remote operator of the UAS 100 receiving the captured images via wireless link to the control system 124. The nose camera 134 may pivot within the nose compartment 114 "horizontally", e.g., around a rotational axis parallel to the yaw axis of the UAS 100. Due to the high-wing configuration of the forward wings 104, 106 and the aft (e.g., tail-mounted) position of the propeller assembly 112, the nose camera 134 may be capable of providing a substantially hemispherical unobstructed field of view, e.g., extending three degrees beyond hemispherical in either direction for a full rotational range of 186 degrees. In this capacity the nose camera 134 may be capable of providing computer vision assistance and unobstructed first-person perspective, e.g., to a remote operator (via wireless link) during auto-land sequences or similar aerial maneuvers.

Cargo Compartment

Figure 7A:
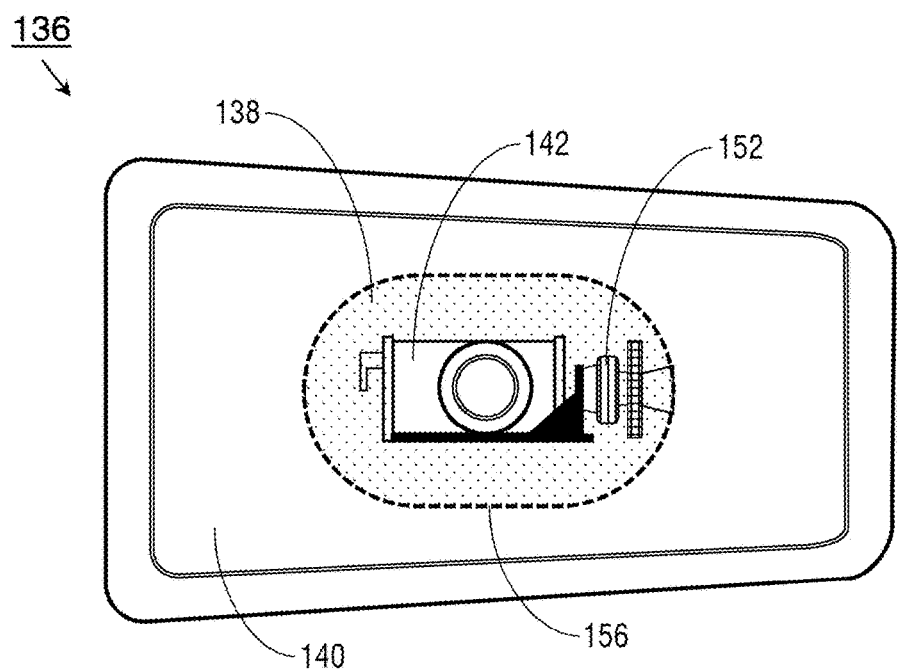
FIGS. 7A and 7B are diagrammatic ventral views of the cargo compartment of FIG. 1.
Figure 7B:
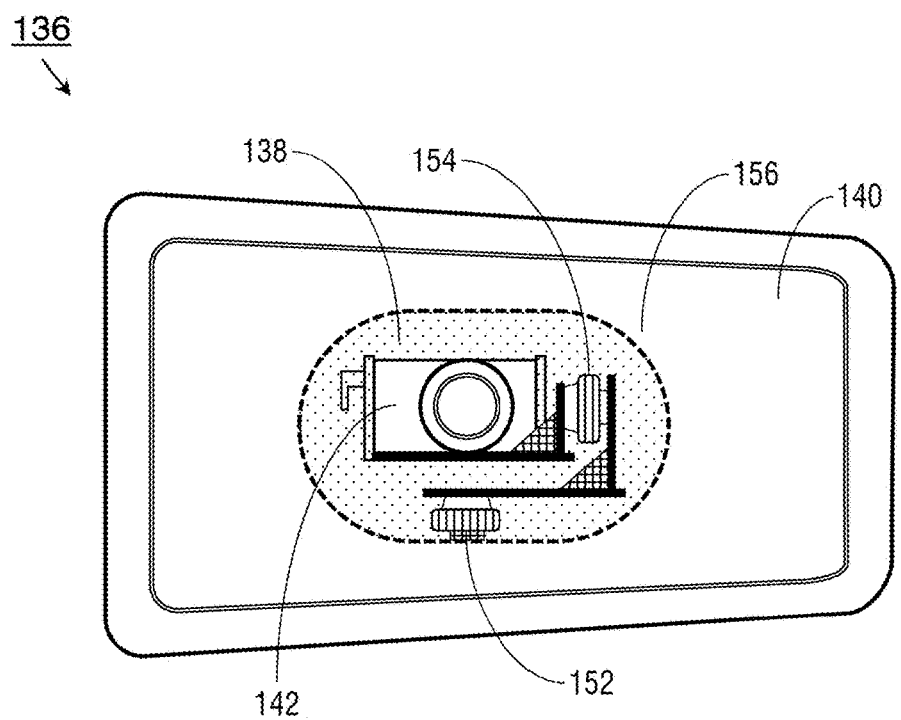

As best shown by FIG. 3, the UAS 102 may include a modular cargo compartment 136 incorporated ventrally into the fuselage 102 between the forward wings 104, 106 and aft wings 108, 110. For example, the longitudinal positioning of the cargo compartment 136 relative to the mean aerodynamic chord of the combined forward and aft wings 104-110 may maximize the overall cargo capacity of the UAS 100 while maintaining the overall balance of the UAS under a broad variety of loading configurations or payload weights by preventing the UAS center of gravity $C_G$ from drifting too far forward or aft, e.g., due to weight distribution or inflight weight shifting. Consequently, the flight characteristics of the UAS 100 may be stabilized under a broader variety of loading configurations and takeoff weights, avoiding deep-stall or stability issues sometimes experienced by canard aircraft incorporating a foreplane in front of the main wing assembly. Referring also to FIGS. 7A and 7B, the modular cargo compartment 136 may include a permanent portion fixed by a top exterior panel 138 into the interior of the fuselage 102. For example, cargo components, cargo payloads, power supplies, processing components, or other like sized payload items may be removably mounted to the interior of the modular cargo compartment 136, which payload items may further be protected by a ventral exterior panel 140 through which a gimbal-mounted ventral camera (142) may be extended, e.g., for ground-based surveillance while the UAS is inflight.

Ducted Propeller Assembly

As best shown by FIG. 1, the propeller assembly 112 may incorporate evenly spaced blades 144 radiating from a central shaft 146, to which the propeller assembly 112 may be mounted to the tail (102a) via the interior mounting shaft 118. The aft positioning of the propeller assembly 112 may enhance the overall yaw stability of the UAS 102 by eliminating yaw moments attributable to spiraling in the slipstream of the aircraft, as might be produced by a forward-mounted propeller. The propeller blades 144 may energize airflow around the aft portion of the fuselage 102 and through the propeller assembly 112, reducing drag on the aft fuselage, by rotating around a shaft axis (148a) defined by the central shaft 146. The propeller blades 144 may be housed in an annular or cylindrical propeller duct (150) (e.g., shroud) extending aft of the propeller blades. Airflow exhausted by the propeller duct 150 at high speed may not flow over any part of the fuselage 102 (due, e.g., to the low-wing configuration of the aft wings 108, 110) and may thus be prevented from generating friction through contact with the fuselage. The propeller duct 150 may protect the operator of the UAS 102 and any proximate bystanders from injury by shielding the propeller blades 144 from incidental contact while simultaneously protecting the propeller blades 144 from damage. The propeller duct 150 may reduce tip losses (e.g., airflow around the tips of the propeller blades 144) by providing a physical separation between air accelerated by the propeller blades and the airstream outside the propeller assembly 112, allowing for greater tip velocity while preserving overall efficiency.

As best shown by FIG. 3, the shaft axis 148a may be canted downward from the horizontal (e.g., a horizontal axis parallel to the roll axis R of the UAS 100) by a fraction of a degree. As best shown by FIGS. 1 and 5, the propeller assembly 112 may provide the UAS 100 with vectored thrust by pivoting around the interior mounting shaft 118 (e.g., around an axis substantially parallel to the yaw axis of the UAS 100). The propeller assembly 112 may pivot through a range of up to 20 degrees; in a preferred embodiment, the propeller assembly 112 may pivot through a range of 5 degrees to port or starboard, or 10 degrees total.

Ventral Camera

Referring in particular to FIG. 7A, the ventral camera 142 may be gimbal-mounted in the cargo compartment 136 such that the ventral camera 142 may be articulated (via a single gimbal 152) by the UAS control system 124 into a downward-facing orientation (e.g., relative to the yaw axis of the UAS 100) for aerial surveillance of terrain overflown by the UAS. Overhead surveillance images captured by the ventral camera 142 may be stored to an onboard memory connected to the UAS control system 124 or transmitted (e.g., after onboard compression or processing) to a remote operator via wireless link to the UAS control system 124, such that the remote operator may track the overhead perspective of the UAS 100 in real time or near real time. Referring in particular to FIG. 7B, the ventral camera 142 may be mounted in the cargo compartment 136 by multiple gimbals 152, 154, allowing the ventral camera 142 additional degrees of freedom. For example, the ventral camera 142 may be extended (via a first gimbal 152 capable of rotating or articulating the ventral camera around a rotational axis parallel to the pitch axis of the UAS 100) through a ventral portal (156) in the ventral exterior panel 140. A second gimbal 154, capable of articulating the ventral camera 142 around a rotational axis parallel to the roll axis of the UAS 100, may then position the ventral camera to capture images of the exterior superstructure of the UAS 100, e.g., to identify any exterior damage sustained by the UAS or determine possible causes of suboptimal UAS operation, such as problems with the propeller assembly 112. Referring back to FIGS. 3 and 4, the cargo compartment 136 and its components (e.g., the ventral camera 142) may be further protected by skids (158) mounted to the underside of the fuselage, which skids may additionally provide tracking stability during takeoffs and landings.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A tandem wing unmanned aircraft system (UAS), comprising:
   a fuselage extending longitudinally from a nose end to a tail end, the nose end including a nose compartment enclosed by at least one transparent exterior panel, the fuselage enclosing at least one of a control system of the UAS and a power source of the UAS;
   at least one wing removably coupled to the fuselage by at least one frangible spar element, the at least one wing associated with a wingspan and having a trailing edge including at least one control surface couplable to the control system, the at least one wing extending from a wing root at a dihedral angle to terminate in a wingtip, the at least one wing comprising:
      at least one forward wing coupled to the fuselage in at least one of a shoulder-wing and a high-wing configuration, the at least one forward wing swept forward at a first sweep angle and including at least a port forward wing and a starboard forward wing; and
      at least one aft wing coupled to the fuselage in a low-wing configuration, the at least one aft wing swept aft at a second sweep angle and including at least a port aft wing and a starboard aft wing;
   a cargo compartment ventrally positioned in the fuselage between the at least one forward wing and the at least one aft wing, the cargo compartment enclosed by at least one ventral exterior panel including at least one ventral opening; and
   a propeller assembly dorsally and pivotably mounted to the tail end and coupled to the control system, the propeller assembly configured to pivot through a first range around a first rotational axis parallel to a yaw axis of the UAS, the propeller assembly comprising:
      a longitudinal shaft defining a shaft axis canted downward at a shaft angle relative to a roll axis of the UAS;
      a plurality of propeller blades extending radially from the longitudinal shaft, the plurality of propeller blades coupled to provide thrust by rotating around the shaft axis; and
      an annular ducted housing surrounding the longitudinal shaft and the plurality of propeller blades and extending aft of the plurality of propeller blades.

2. The tandem-wing UAS of claim 1, wherein the at least one frangible spar element includes at least one of a first frangible spar element having a first thickness and a second frangible spar element having a second thickness.

3. The tandem wing UAS of claim 1, wherein the dihedral angle is between 3 and 5 degrees.

4. The tandem wing UAS of claim 1, wherein the shaft angle is at most one degree.

5. The tandem wing UAS of claim 1, wherein the at least one wingtip is 50 mm higher than the corresponding wing root.

6. The tandem wing UAS of claim 1, wherein the at least one first frangible spar element includes one or more of:
   a forward frangible spar element coupling the port forward wing to the starboard forward wing; and
   an aft frangible spar element coupling the port aft wing to the starboard aft wing.

7. The tandem wing UAS of claim 1, wherein the first range is at most 20 degrees.

8. The tandem-wing UAS of claim 1, further comprising:
   at least one nose camera rotatably mounted to the fuselage and enclosed within the nose compartment, the nose camera coupled to, and articulable by, the control system, the nose camera configured to:
   capture at least one first image; and
   rotate through a nose angle around a nose axis parallel to the yaw axis.

9. The tandem-wing UAS of claim 8, wherein the nose angle is at least 180 degrees.

10. The tandem-wing UAS of claim 1, further comprising:
    at least one ventral camera pivotably mounted within the cargo compartment by a pivotable mount including at least one gimbal, the ventral camera coupled to the control system and articulable by the control system via the pivotable mount, the ventral camera configured to:
    capture at least one second image associated with one or more of a surface overflown by the UAS and an exterior surface of the UAS; and
    extend through the at least one ventral opening via the pivotable mount.

11. The tandem-wing UAS of claim 1, wherein the at least one control surface includes an independent control unit coupled to the control system and configured to articulate the control surface; and
    the at least one control surface is configured to function as one or more of an aileron, a flap, and an elevator.

12. The tandem-wing UAS of claim 11, wherein the at least one independent control unit is coupled to the control system via a first power connector positioned on the wing root, the first power connector removably attachable to a second power connector positioned in the fuselage, the second power connector coupled to the control system.

13. The tandem-wing UAS of claim 1, wherein the at least one control surface extends for at least 75% of the wingspan.

* * * * *